Feb. 15, 1966  R. G. BYERS ETAL  3,235,410
BATTERY ASSEMBLY
Filed June 1, 1961  2 Sheets-Sheet 1

INVENTOR.
Robert G. Byers,
BY Richard A. Jones, &
Glenn W. Schubert

ATTORNEY

Feb. 15, 1966 R. G. BYERS ETAL 3,235,410
BATTERY ASSEMBLY
Filed June 1, 1961
2 Sheets-Sheet 2
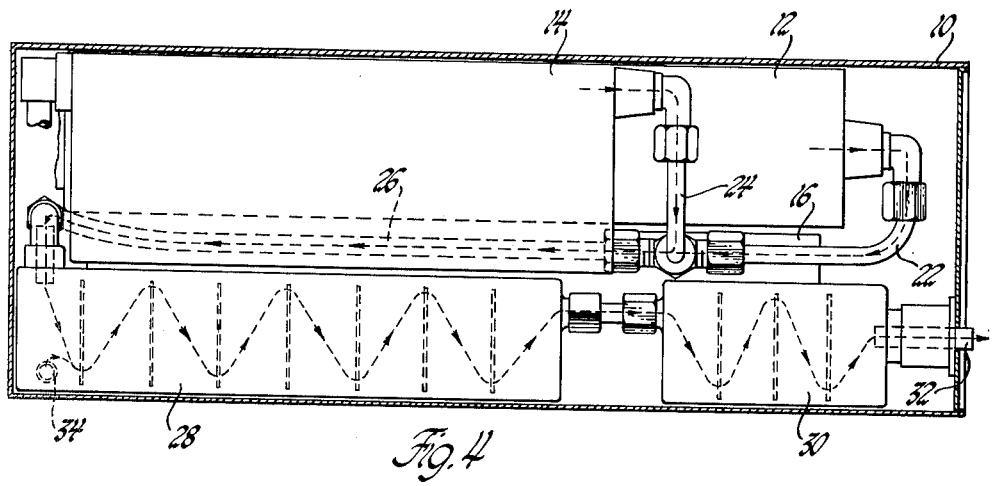
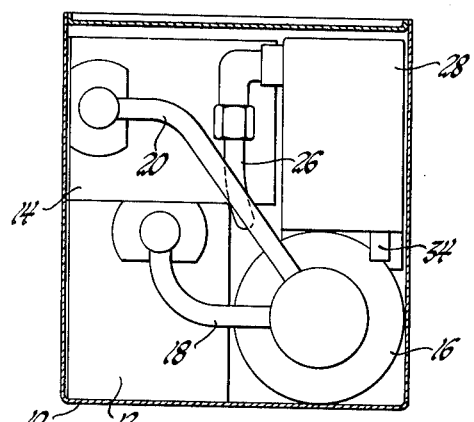
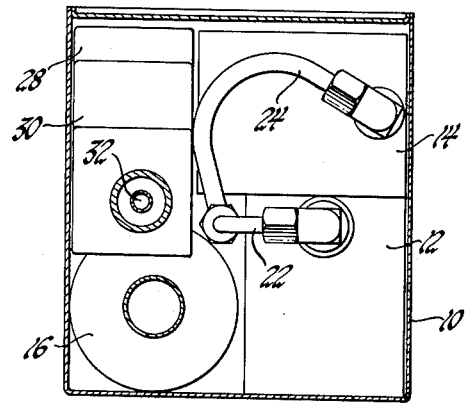
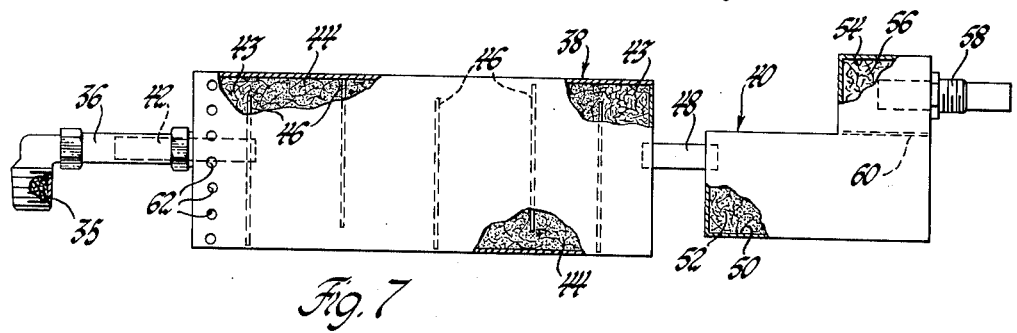
INVENTOR.
Robert G. Byers,
BY Richard A. Jones, &
Glenn W. Schubert
ATTORNEY United States Patent Office 3,235,410
Patented Feb. 15, 1966

3,235,410
BATTERY ASSEMBLY
Robert G. Byers, Anderson, Richard A. Jones, Muncie, and Glenn W. Schubert, Yorktown, Ind., assignors to General Motors Corporation, Detroit, Mich., a corporation of Delaware
Filed June 1, 1961, Ser. No. 114,142
8 Claims. (Cl. 136—163)

This invention involves a high rate battery and more particularly it pertains to a process and apparatus involving a high rate primary battery assembly, such as a remotely activated silver oxide-zinc battery assembly.

High rate batteries are batteries which are designed to be discharged at extremely high electrode current densities. Batteries which serve as a source of electrical power for missiles must produce extremely large amounts of power per unit weight and volume in a relatively short period of time. Such batteries are, therefore, quite compact and are discharged at an extremely high rate. Discharge of a battery at such an extremely high rate generates heat. The heat generated during discharge of a missile battery is sufficient to vaporize the solvent in the battery electrolyte solution, forming steam. The steam pressure, if not relieved in some way, can become great enough to explode the battery. It has been customary to relieve the steam pressure by externally venting the battery, permitting the steam to escape outside the battery.

Unfortunately, the simple pressure relief in this manner has been found to create another problem. The vented steam carries battery electrolyte along with it. The electrolyte in many batteries is extremely corrosive. The electrolyte in a silver oxide-zinc battery, a frequently used type of battery for missile applications, is generally a strong aqueous solution of potassium hydroxide. The potassium hydroxide expelled from the battery by the steam can attack materials in the missile surrounding the battery. Such attack is objectionable since the deleterious action of the electrolyte on the adjacent equipment in the missile can cause, and has caused, a missile to fail in its intended mission. Such action obviously cannot be tolerated.

Liquid absorbers have been used to absorb the electrolyte but these have only been partially effective. The steam pressure is still large enough, in many instances, to force the electrolyte through the absorbent and out the vent.

An object of the present invention is to provide both a method and an apparatus for relieving the pressure of vapors generated by the battery during discharge without creating the aforementioned incidental problem arising in conventional external venting.

Other objects, features and advantages of the invention will become more apparent from the following specific examples thereof and from the drawings, in which:

FIGURE 4 is a sectional view along the line 4—4 of FIGURE 3;

FIGURE 5 is a sectional view along the line 5—5 of FIGURE 3;

FIGURE 6 is a sectional view along the line 6—6 of FIGURE 3; and

FIGURE 7 schematically shows a device into which fluids generated during rapid discharge of a battery are passed to condense and trap them so as to inhibit passage of electrolyte out of the battery assembly.

Briefly, the invention comprehends placing the fluids expelled from the battery during rapid discharge in contact with a material which reacts endothermically with one or more of the substances forming the battery effluent, to thereby cool the effluent. The cooled effluent condenses to form a liquid which can be readily absorbed with a compact absorbing means. More specifically, the invention encompasses placing the steam generated during rapid discharge of a silver oxide-zinc battery in contact with a substance which has a negative heat of solution. The steam in dissolving the condenser material loses heat. The loss in heat condenses the steam to not only relieve the pressure of the effluent but also permit it to be readily absorbed by a compact absorber.

While our invention can be used in other applications than battery assemblies which are electrical power sources in missiles, it is primarily useful in missile battery assemblies. Missiles frequently require at least two batteries. It is convenient to house these two batteries in the same assembly to conserve weight and space. The two batteries are then vented through a common venting system. A battery assembly of this type which includes the present invention is diagrammatically shown in FIGURE 1.

Figure 1:
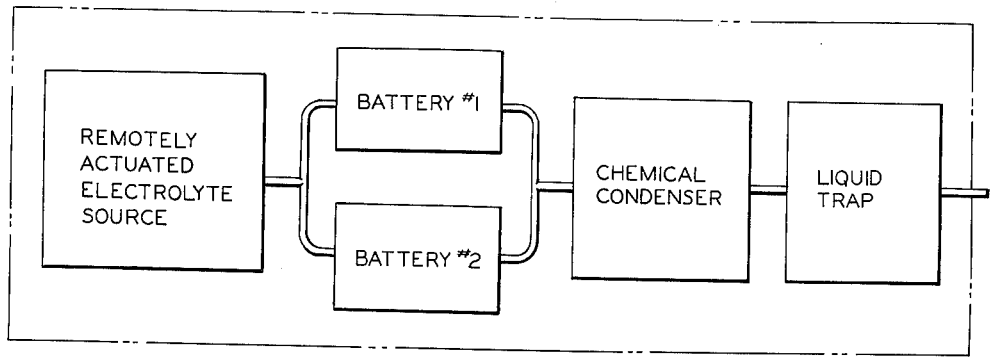
FIGURE 1 is a diagrammatic view showing an externally vented, remotely activated battery assembly formed in accordance with the invention.

Missile batteries are generally of the reserve type and are activated only shortly before use. Hence, as shown in FIGURE 1, a missile battery assembly would include a housing containing a remotely actuated source of electrolyte serving two separate batteries. These two batteries are, in turn, in communication with a chemical condenser which contains a substance which reacts endothermically with the battery discharge effluent. The endothermic reaction cools the effluent to condense vapors which are then trapped in both the chemical condenser and the liquid trap.

In some instances the remotely actuated electrolyte source may not function properly so that an undesirably small amount of electrolyte is injected into the batteries during activation. Under such circumstances the batteries create an abnormally high amount of heat and, therefore, an abnormally large amount of vapor during rapid discharge. It may not be convenient to design the condenser and trap to completely accommodate such abnormal operation and, if so, externally venting the batteries, venting the condenser and trap to the area surrounding the battery assembly, is desired as a safety factor. This safety factor may be especially desired when a single condenser and trap is serving two batteries in an assembly. Hence, the external venting is shown in FIGURE 1.

Figure 2:
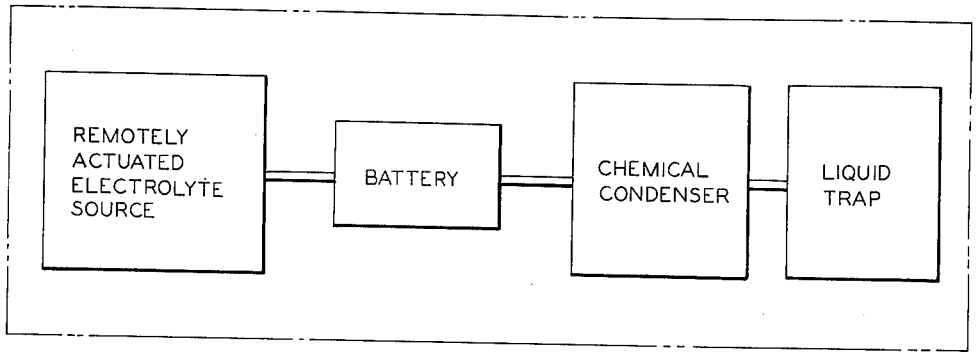
FIGURE 2 is a diagrammatic view showing a nonvented remotely activated battery assembly which is formed in accordance with the invention.
Figure 3:
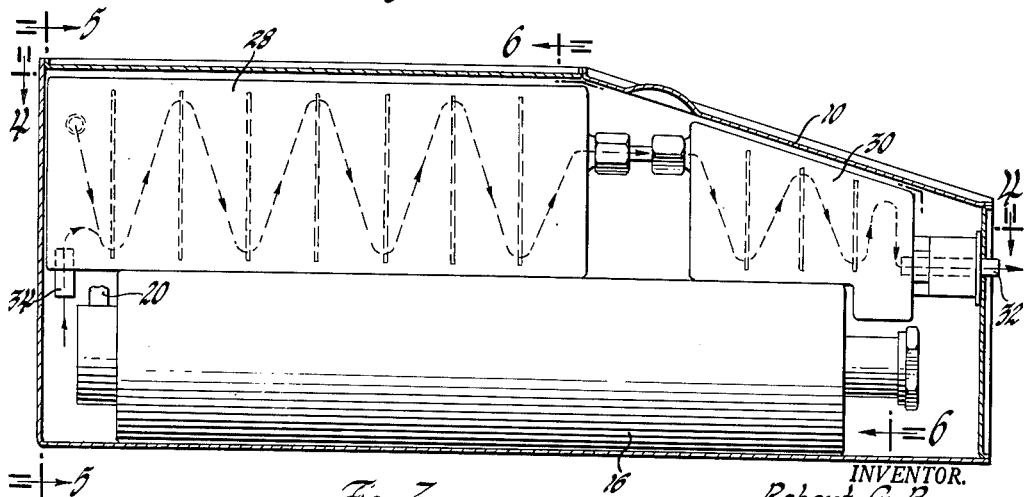
FIGURE 3 is a schematic sectional view showing the relative disposition of parts in a remotely activated externally vented battery assembly formed in accordance with our invention.

As shown in FIGURE 2, when only a single battery is present in the assembly it is more convenient to design the condenser to accommodate even the abnormal generation of heat from a battery. Thus, even when an unusually high amount of effluent is expelled from the battery, the battery assembly still need not be vented. Accordingly, such a battery assembly would include within the battery housing a remotely actuated source of electrolyte, a battery, a condenser and a trap which are in respective successive communication with one another, without the liquid trap being externally vented.

It is to be noted, of course, that quite frequently there is a small amount of unused space within the housing of the battery assembly. In such instance it may be desirable to vent the liquid trap into the interior of the housing to utilize this area to accommodate the aforementioned abnormal operation of the battery without designing the condenser and trap to completely accommodate it and without externally venting the battery assembly.

The remotely activated battery assembly shown in FIGURES 3, 4, 5 and 6 serves as a specific example of the manner in which our invention is included in such a battery assembly. These figures show a battery assembly housing 10 containing two reserve-type batteries 12 and 14 which are supplied with electrolyte by the same remotely activated source. The source of electrolyte is a cylindrical chamber 16 in which a piston (not shown) is disposed. Remotely actuated means (not shown) are used to urge the piston against electrolyte in the reservoir causing it to flow from the reservoir through the conduits 18 and 20 into the batteries 12 and 14, respectively. A manifold (not shown) within each of the batteries conveys electrolyte to the separate cells of the batteries. The conduits 22 and 24 are respectively attached to the end of each battery opposite the end at which electrolyte is injected into the battery. The conduits 22 and 24 can be connected directly to the electrolyte manifold. If so, it may be desired to include a fluid rate of flow control within them at some point.

The conduits 22 and 24 join tube 26 which is in communication with a chemical condenser 28 within the housing. The chemical condenser is, in turn, in communication with a liquid trap 30 which is externally vented at 32.

Since there is a possibility that, due to a defect in the battery, gases generated in the battery leak through the battery wall and into the assembly housing, auxiliary means are provided in the form of a pressure relief valve 34 on the condenser to permit gases in the housing to enter the condenser for pressure relief. In such instance the vapors first fill the unused space in the housing to create a sufficient pressure to actuate the auxiliary relief valve 34 on the condenser 28 and thereby pass into the condenser through the trap 30 and be vented, if necessary.

As previously indicated, our invention involves placing the steam generated in a silver oxide-zinc battery in contact with a substance which will react endothermically with the steam to condense it, permitting the effluent of the battery during discharge to be accommodated entirely within the battery housing, even though it may be preferred to vent the housing as an additional safety factor. A specific example of the condenser and liquid trap system is shown in FIGURE 7.

As shown in FIGURE 7, vapors from the battery are initially passed through a filter 35 which prevents debris from the reservoir and the battery from entering the condenser and trap system. The effluent then passes through an orifice valve at 36 which restricts the rate of flow into the condenser 38 and trap 40. A hermetic seal of the battery is insured by using a pressure relief valve 42 on the inlet end of the condenser 38. A pressure relief valve actuated at about fifteen pounds per square inch is generally suitable.

The condenser 38 is a compartmentized container having an absorbent packing material 43 at each end to retain the condenser material 44 in place. The compartments of the condenser are formed by a plurality of baffles 46. The individual compartments contain the endothermic reactive substance, preferably mixed with an appropriate proportion of a cellulosic material, such as cotton. The compartments can also be formed using perforated walls having nonregistered apertures therein instead of the baffles 46 shown in FIGURE 7.

The condenser is in communication with a liquid trap 40 by means of a tube 48 containing an orifice valve to additionally control the rate of flow through the condenser. The liquid trap is also compartmentized. A lower compartment 50 contains a cellulosic absorbent 52, such as cotton, while the upper compartment 54, also containing a liquid absorbent 56, has a pressure relief valve 58 acting at about three pounds per square inch. The two compartments 50 and 54 of the liquid trap 40 are separated by a perforated wall 60. The pressure relief valve additionally insures a hermetic seal for the battery and is disposed in the upper compartment 54 to additionally inhibit contact of the valve with a liquid which may be trapped in the lower compartment 50.

The inlet end of the condenser 38 can be provided with a plurality of apertures 62 therein which permit gases to escape from the battery directly into the condenser without passing through the filter and associated conduit. As shown in connection with FIGURES 3, 4, 5 and 6, these apertures may be replaced by a low pressure relief valve (reference numeral 34 in FIGURES 3 through 6) of about one and one-half pounds per square inch. The diameter of the orifice valves at 36 and 48 on either end of the condenser will vary according to the nature, particularly the size, of the assembly.

The most effective way to remove heat from the effluent of the battery is to directly react the steam with a substance which will take heat from the steam. A substance having a negative heat of solution will perform this function. Such a substance endothermically reacts with the steam when the steam dissolves it, absorbing heat from the steam, to thereby condense it. Substances which function in this manner are potassium thiocyanate, potassium nitrate, sodium acetate, sodium chloride and ammonium thiocyanate. Potassium thiocyanate is by far the msot effective of these substances in accomplishing the object of the invention.

While this invention has been described in connection with certain specific examples thereof, no limitation is intended thereby except as defined in the appended claims.

We claim:

1. In an alkaline high rate primary battery assembly, at least one cell enclosure, a condenser container having a substance therein which reacts to endothermically condense a vapor generated by rapid discharge of the cell in said enclosure, pressure responsive valve means communicating the cell enclosure with the endothermically reactive condenser, means for filtering the vapor from said enclosure before it contacts the condenser, and at least one receptacle having a liquid absorbent therein communicating with said condenser container for absorbing the condensed vapor.

2. An alkaline high rate primary battery assembly having a housing and, in said housing, a plurality of cell enclosures, a condenser container having a substance which reacts endothermically to condense steam generated by rapid discharge of the cells in said enclosures, pressure responsive valve means for communicating said cell enclosures with said endothermically reactive condenser, means for filtering the steam exiting said cell enclosures before it contacts the condenser, means for controlling the rate said steam exits said enclosures, liquid absorbent means communicating with the condenser container for absorbing the condensed steam, means for controlling the rate of fluid flow from said condenser container to said absorbent means, and pressure responsive means for venting said absorbent means outside said housing.

3. In an alkaline high rate primary battery assembly, at least one cell enclosure, a condenser container having at least one endothermically reactive substance therein selected from the group consisting of potassium thiocyanate, potassium nitrate, sodium acetate, sodium chloride and ammonium thiocyanate for condensing steam generated by rapid discharge of the cell in said enclosure, pressure responsive valve means for communicating the cell enclosure with said endothermically reactive condenser, means for filtering the vapor exiting said enclosure before it contacts the condenser, and at least one receptacle having a liquid absorbent therein communicating with said condenser container for absorbing the condensed vapor.

4. In a high rate silver oxide-zinc battery assembly, a plurality of cell enclosures having silver oxide electrodes and zinc electrodes and an aqueous potassium hydroxide electrolyte solution, a container having therein a substance from the group consisting of potassium thiocyanate, potassium nitrate, sodium acetate, sodium chloride and ammonium thiocyanate, pressure responsive means for communicating said cell enclosures with said container, means for controlling the rate an effluent exits said enclosures during high rate discharge, liquid absorbent means in communication with said container and means for regulating the rate of fluid flow from said container into said absorbent means.

5. In a high rate silver oxide-zinc battery assembly, a plurality of cell enclosures having silver oxide electrodes and zinc electrodes with an aqueous potassium hydroxide electrolyte solution, a compartmentized container having potassium thiocyanate therein for reaction with a cell discharge effluent, pressure responsive means for communicating said cell enclosures with said container, means for controlling the rate said effluent exits said enclosures, compartmentized liquid absorbent means communicating with said container, means for regulating the rate of fluid flow from said container into said absorbent means and pressure responsive means for venting said absorbent means to its ambient.

6. The process which comprises the steps of discharging a silver oxide-zinc battery at a sufficiently rapid rate to generate steam, passing said steam through a container at a controlled rate, said container having therein a substance which has a negative heat of solution, and absorbing the liquids formed by condensing said steam.

7. In a process for generating electrical current with a high rate battery, the steps of relieving pressures generated within the battery by placing vapors generated in the battery during high rate discharge in contact with an endothermically reactive substance selected from the group consisting of potassium thiocyanate, potassium nitrate, sodium acetate, sodium chloride and ammonium thiocyanate.

8. The process which comprises the steps of discharging a battery at a high rate, steam being produced within the battery during said discharge, at least partially condensing said steam by placing it in contact with an endothermically reactive substance selected from the group consisting of potassium thiocyanate, potassium nitrate, sodium acetate, sodium chloride and ammonium thiocyanate, and collecting the water formed by said condensed steam.

References Cited by the Examiner

UNITED STATES PATENTS

| | | | |
|---|---|---|---|
| 1,302,648 | 5/1919 | Flanders | 136—180 |
| 1,587,147 | 6/1926 | Clark | 136—180 |
| 1,894,775 | 1/1933 | Levenson | 62—4 |
| 2,608,595 | 8/1952 | Conklin | 136—107 |
| 2,864,881 | 12/1958 | Doyen | 136—113 |

WINSTON A. DOUGLAS, *Primary Examiner.*

JOSEPH REBOLD, JOHN H. MACK, *Examiners.*